Figure 1:
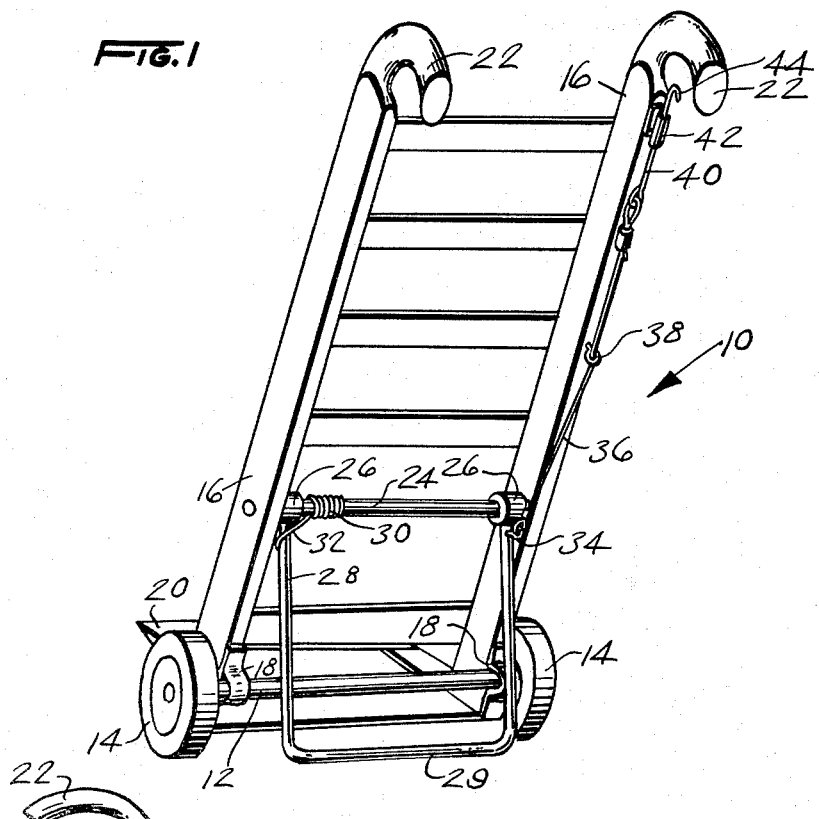

March 30, 1965 P. J. GARRISON 3,175,835
DOLLIE CURB JUMPER
Filed Jan. 15, 1963

INVENTOR.
PAUL J. GARRISON

3,175,835
DOLLIE CURB JUMPER
Paul J. Garrison, 2820 S. Taylor, Little Rock, Ark.
Filed Jan. 15, 1963, Ser. No. 251,537
1 Claim. (Cl. 280—5.32)

This invention relates to material handling devices and, more particularly, to a load carrier.

It is an object of the present invention to provide a hand truck or dollie having retractable fulcrum means for elevating the lower load carrying platform thereof on to an elevated level, such as a curb or step, in a simple and convenient manner.

A further object of the present invention is to provide a curb jumping dollie of the type described which will facilitate the movement of heavy loads on to elevated levels without stress or strain, and which will not interfere with the otherwise normal operation of the carrier.

Aside from the foregoing specific objects, another important object of this invention is to provide an improved dollie curb jumper which will achieve the foregoing results in a new and novel manner so as to represent a general advance in this field.

With the above and numerous other objects in view as will appear as the description proceeds, the invention consists in certain novel features of construction, and in the combination and arragnement of parts as will be hereinafter more fully described and claimed.

Figure 2:
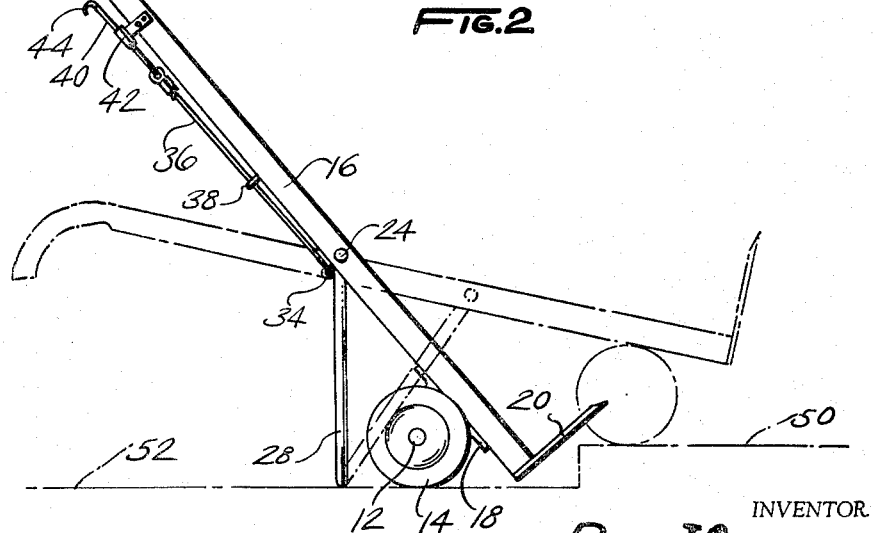

In the drawings:

FIGURE 1 is a perspective view of a dollie curb jumper made in accordance with the present invention; and FIGURE 2 is a side elevational view of the device shown in FIGURE 1 in actual use.

Referring now to the drawing, a curb jumping dollie 10 made in accordance with the present invention is shown to include an axle 12 having a pair of wheels 14 supported upon opposite ends thereof. A pair of stanchions 16 are provided with bearings 18 rotatably receiving the axle 12 and having a load supporting platform 20 secured to the lower ends thereof. The opposite upper ends of the stanchions 16 have handles 22 guiding the dollie during use.

A cross shaft 24 extends transversely between the stanchions 16 intermediate the opposite ends thereof. A U-shaped bail member 28 has bearing sleeves 26 secured to the free ends thereof and rotatably received upon the ends of the cross shaft 24, whereby the bail member 28 is rotatable between a normal storage position substantially coextensive with and between the stanchions 16, and narrowly projecting position whereby the bight portion 29 thereof engages the ground during use, as will be hereinafter more fully described.

A torsion spring 30 secured upon the cross shaft 24, has one end 32 acting upon one side 28 of the bail member normally urging the bail member toward the retracted position coextensive with the stanchions.

The other side of the bail member is provided with a mounting hook 34 to which one end of a flexible cable 36 is secured. This cable is guided through ferrules 38 toward the upper extremity of one of the stanchions 16 in proximity with the respective handle 22. A bar 40 slidably carried upon a guide member 42 of the stanchion 16, is secured at one lower end to the free end of the cable 36, and has a finger grip or trigger 44 formed at its upper end. Thus, by exerting an upward pull upon the finger grip 44, the cable 36 will act upon the bail 28 to pivot it outwardly against the action of the spring 30, to the operative position illustrated in FIGURES 1 and 2. In the operative position, the bail may be engaged with the ground, and the dollie pivoted about the cross shafts 24 to elevate the load carrying platform 20 and wheels 14 on to a higher level 50 from a lower level 52, in a simple and effortless manner. After the dollie has been elevated as described, the pull upon the trigger 44 may be released, whereby the spring 30 will return the bail member to the retracted position between the stanchions 16, for normal continued use of the dollie.

It will now be appreciated that this device will substantially facilitate the use of load carrying dollies in various types of situations, and will avoid unnecessary strain and physical stress upon the user.

It will now be apparent that changes in the details of construction, and in the combination and arrangement of parts may be resorted to without departing from the spirit or scope of the invention as hereinafter claimed or sacrificing any of its advantages.

Having thus described this invention, what is claimed as new is:

In a load carrying device of the upright dollie type comprising parallel, braced stanchions provided at their lower extremities with an outwardly extending platform and paired wheels and with handle means at their upper extremities, a lateral shaft extending between said stanchions positioned between their centers and lower extremities, a U-shaped bail member provided at its upper extremities with cylindrical bearing means pivotally fitted over the extremities of said lateral shaft, a torsion spring fitted about one lateral extremity of said shaft, a downwardly depending extension from said torsion spring bearing against one arm of said bail member forcing said bail member inwardly against the lower extremities of said stanchions into retracted position, hook means provided at the upper extremity of the opposite arm of said bail member, a cable affixed at its lower extremity to said hook means extending upwardly adjacent one of said stanchions, guide means on said stanchion slidably receiving said cable, bar means pivotally affixed at its lower extremity to the upper extremity of said cable, guide means affixed to the upper extremity of said stanchion slidably receiving said bar means, an outwardly disposed trigger at the upper extremity of said bar means lying adjacent to and in the same plane as the stanchion handle, whereby upward pressure exerted against said trigger will be translated through said cable to pull said bail outwardly on said shaft against the action of said torsion spring into operating position and release of pressure against said trigger will permit said torsion spring to force said bail inwardly into retracted position against the axle.

References Cited by the Examiner
UNITED STATES PATENTS

| 269,248 | 12/82 | Wetmore | 280—5.32 |
| 389,711 | 9/88 | Miller et al. | 280—5.32 |
| 814,874 | 3/06 | Rowe | 280—5.32 |

FOREIGN PATENTS

| 137,096 | 1/20 | Great Britain. |
| 185,067 | 8/22 | Great Britain. |

A. HARRY LEVY, *Primary Examiner.*

LEO FRIAGLIA, *Examiner.*